G. W. TOPLIFF & C. BORNMANN.
PHOTOGRAPHIC CAMERA.
APPLICATION FILED DEC. 14, 1911.

1,034,045.

Patented July 30, 1912.

2 SHEETS—SHEET 1.

Witnesses:
Max B. A. Doring
F. M. Donsback

Inventors
Carl Bornmann and George W. Topliff
By their Attorney
Phillips Abbott

G. W. TOPLIFF & C. BORNMANN.
PHOTOGRAPHIC CAMERA.
APPLICATION FILED DEC. 14, 1911.
1,034,045.
Patented July 30, 1912.
2 SHEETS—SHEET 2.
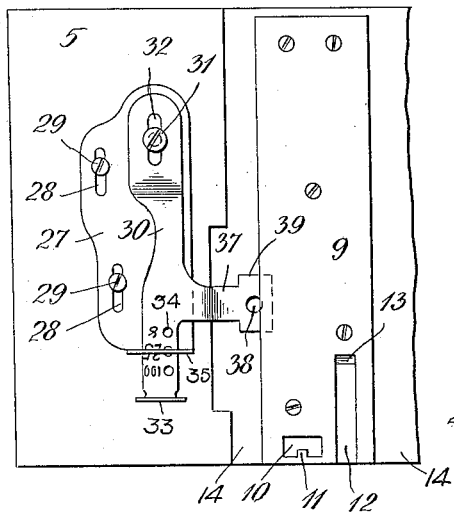
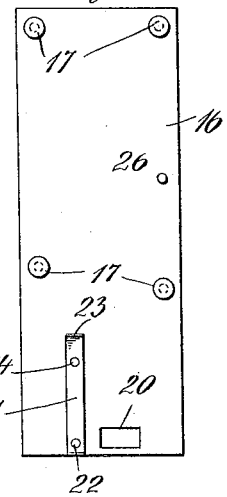
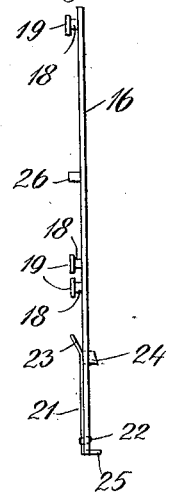
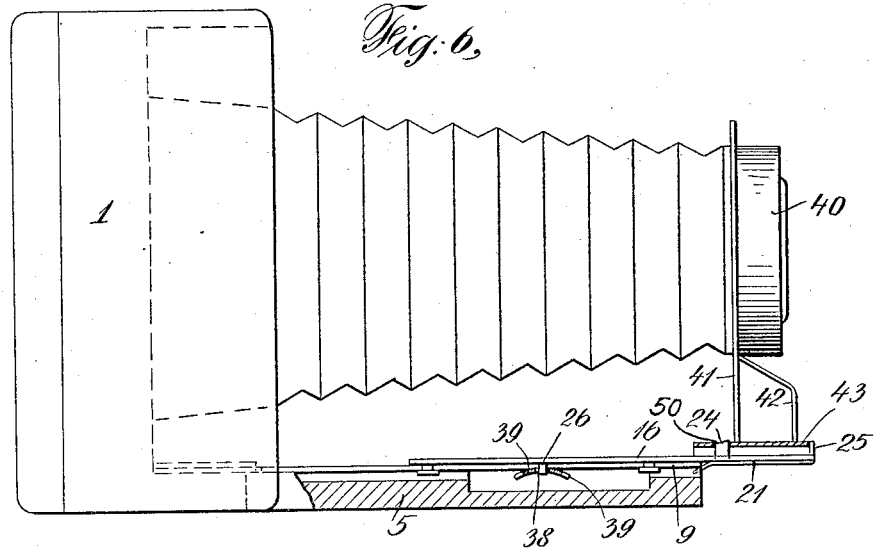

UNITED STATES PATENT OFFICE.

GEORGE W. TOPLIFF AND CARL BORNMANN, OF BINGHAMTON, NEW YORK, ASSIGNORS TO ANSCO COMPANY, OF BINGHAMTON, NEW YORK.

PHOTOGRAPHIC CAMERA.

1,034,045.  Specification of Letters Patent.  Patented July 30, 1912.

Application filed December 14, 1911. Serial No. 665,778.

*To all whom it may concern:*

Be it known that we, GEORGE W. TOPLIFF and CARL BORNMANN, both citizens of the United States, and residents of the city of Binghamton, county of Broome, State of New York, have jointly invented certain new and useful Improvements in Photographic Cameras, of which the following is a full, clear, and exact description.

It is the purpose of our invention to so construct the apparatus that the lens may be projected from the focal plane of the camera sufficiently to provide the necessary focal distance and yet the size of the camera be materially reduced.

The invention also includes certain improvements in the structure of the parts whereby economy, simplicity and increased efficiency in operation are secured; and lastly, the invention includes improvements in the focusing devices, whereby what we term an automatic lock focus is secured.

We illustrate the invention as applied to a folding camera, since its advantages are more pronouncedly realized in that form. It is, however, adapted to practically all forms of cameras and we therefore do not limit ourselves to the folding variety.

Figure 1:
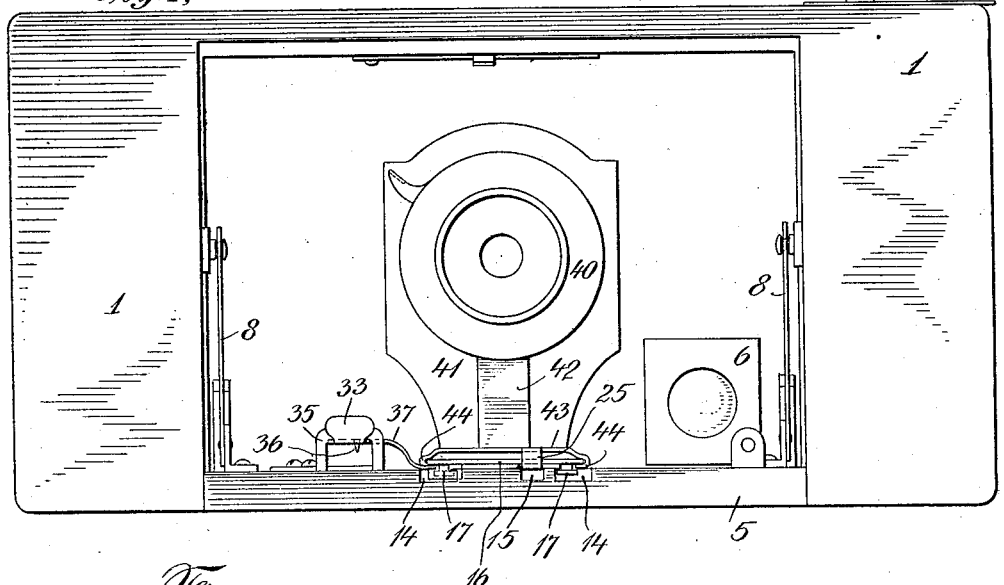
Figure 2:
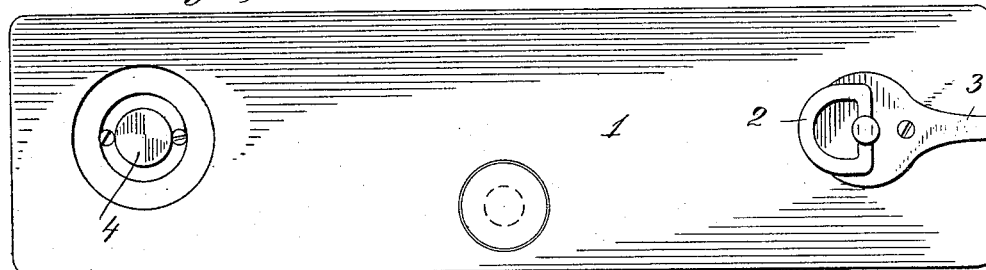
Figure 2:
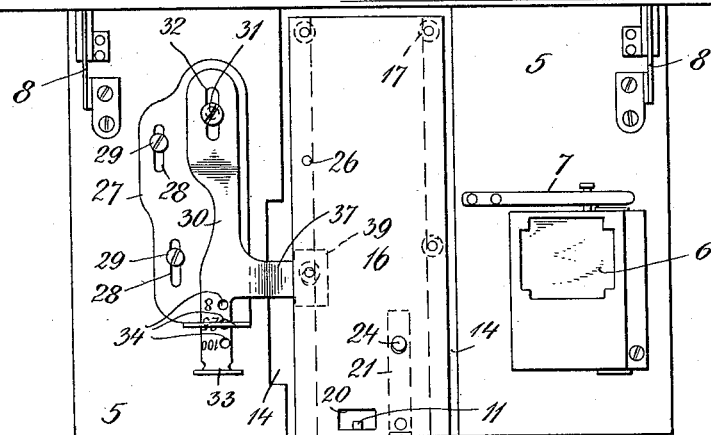

Referring to the drawings, Figure 1 illustrates an elevation of a camera, the front board of which has been lowered, thus exposing the interior parts; Fig. 2 illustrates a plan view of that which is shown in Fig. 1; Fig. 3 illustrates a plan view of the adjustable lever and base plate of the automatic lock focus apparatus and slideway for a movable plate which supports the lens frame; Fig. 4 illustrates a view of the under side of the movable lens supporting plate; Fig. 5 illustrates an edgewise view of that which is shown in Fig. 4; Fig. 6 illustrates a side elevation of that which is shown in Fig. 1, certain of the parts not involved herein being omitted, the movable lens supporting plate and its slideway being shown in elevation, but the front board partially in section and the automatic lock focus apparatus mostly removed; Fig. 7 illustrates a detail.

In the drawings, 1 represents the body or box part of the camera, 2 the thumb piece of an ordinary winding key, 3 a horn projecting from the casing of the winding key to which the handle is attached, 4 one of the pin journals for the stock spool, 5 the hinged front board, 6 the finder, 7 the spring control for the finder, and 8, 8, the ordinary supports for the front board. All of these parts are or may be of any preferred construction.

9 is the slideway plate. It is rigidly fastened to the front board in any preferred manner and is best shown in Fig. 3. It is provided with an opening 10 in which is a projecting stud 11 which engages with a suitable latch on the body of the camera for holding the front board up when closed, as usual. The plate 9 also has a slot 12 cut in it, the inner end 13 of which is preferably squared to better engage with the spring 21. By the sides of this plate 9 there are cut in the front board longitudinal grooves or recesses 14, 14, and another groove 15 between them. The grooves 14, 14 are made to afford space for the guiding studs 17 attached to the under side of the movable lens carrying plate which is superposed upon and slides longitudinally of the slideway plate 9. The under side of the movable plate referred to is shown in Fig. 4 at 16. It has projecting downwardly from it a series of guiding studs 17 above referred to. They are composed of a stem part 18 (see Fig. 5) and an enlarged head-like part 19 and they are so adjusted that they act as guides for the plate 16, since they embrace the edges of the slideway plate 9, as seen best in Fig. 1. The plate 16 also has an opening 20 in its forward edge, which is adapted to register with the opening 10 in the slideway plate 9. It is also provided with a spring 21 which is fastened at its forward end, say at 22, to the plate 16 and its rear end is bent downwardly, as shown at 23, and a pin 24, the outer surface whereof is inclined, as shown in Fig. 5, passes through a hole in the plate 16 and is connected to the spring 21. The forward end of the spring 21 is bent upwardly, forming a stop 25. On the under side of the plate 16 there is a pin 26 which engages with the automatic lock focusing device in a manner about to be described.

The lock focusing devices consist of a base plate 27 (see Fig. 3) provided with slots 28 and screws 29 which work in the slots. These are provided so that the base plate may be adjusted forwardly or rearwardly at the factory during manufacture, as may be necessary to secure proper adjustment of the lens, so that it may properly coincide with the distances marked upon the automatically acting locking lever about to be described. This is desirable because frequently lenses vary somewhat in their focal distance.

30 is what we call the lever of the lock focusing devices. It is made of suitable spring metal. Its rear end is adjustably held to the base plate 27 by a set screw 31 which works in a slot 32 made in the spring plate and at the other end of this plate is an upturned thumb piece 33, whereby it may be easily manipulated and adjacent to the thumb piece are a series of holes 34, (three are shown in the present instance), and this end of the lever passes through a small stationary yoke 35 which forms part of the base plate 27 and from this yoke a pin 36 projects downwardly and engages in one or the other of the holes 34 in the lever, depending upon its adjustment.

37 is a laterally extending arm projecting from the lever 30 and has an opening 38 in its terminal part which is preferably squared as at 39, 39, the lateral edges of the squared part being bent downwardly, as shown best in Fig. 6, to facilitate engagement with the stud 26, and this part of the arm projects under the plate 16, so that the stud 26 upon the plate (see Fig. 5) will register with the opening 38 in the said projection.

The lens frame 40 (see Fig. 1) is supported upon an upright plate 41, (see Figs. 1 and 6) and is braced by an angle piece 42, the lower ends of the two last named parts being brazed or otherwise fastened to the usual base part 43 of the frame, the edges of which 44 (see Fig. 1) embrace the edges of the slide plate 16 and slide thereon in a manner well understood.

The operation is as follows: Assuming the camera to be closed, to open it the latch is released from engagement with the stud 11 on the slideway plate in the usual manner and the front of the camera is lowered, whereupon the braces 8 engaging with their co-acting parts will hold it in its projected position. The sliding plate 16 is at this stage in its retracted position, as shown in Fig. 2, in which the movable end of the spring 21 is in engagement with the inner end 13 (see Fig. 3) of the slot 12 in the slideway plate 9 and the spring has been deflected downwardly, so that the pin 24 upon it has been depressed or drawn downwardly, as shown in Fig. 7. The operator then, after having first preferably swung the finder outwardly to the right, so as to give himself more space for the manipulation of the lens frame and attached parts, lays hold of the lens frame, preferably by means of the brace 42 which serves as a convenient and properly located handle, and pulls the lens frame forwardly, whereupon the turned under edges 44 of the base 43 of the lens frame will properly engage with the edges of the movable plate, as plainly illustrated in Fig. 1. The lens frame is then pulled farther forwardly, during which act it will slide smoothly over the movable plate 16 until the forward end of the base 43 strikes the stop 25, as shown in Fig. 6, and thereafter during the further outward movement of the lens frame, the movable plate 16 will be carried with it and in so doing the inner free end of the spring 21 will be removed from contact with the end 13 of the slot 12 in the plate 9 and the spring then closing against the bottom of the plate 16, will project the pin 24 upwardly, so that it will pass through a hole 50 made in the top of the base 43 as shown in Fig. 6. In this way the lens frame will be securely and automatically locked to the sliding plate 16 and prevented from backward movement when released by the operator.

The proper focal distance is determined in the following manner. The holes 34 made in the lever 30 (three only are shown in the present case, but there may be more or less, as preferred), are, during the construction of the apparatus, each carefully adjusted in location to coincide with a stated distance, as for example, in the case shown, the hole nearest the slotted end of the lever is adjusted to 8 feet, the medial one to 25 feet, and the outer or most forward one to 100 feet. The operator thereupon taking hold of the thumb piece 33 of the lever 30 depresses it, so that the pin 36 (see Fig. 1) is removed from such one of the holes 34 as it may have been in and then slides the lever 30 inwardly or outwardly, as the case may be, until the distance he desires registers with that pin. Thereupon he lets go of the lever, the pin enters the appropriate hole and the lever is thus locked in that position. Thereupon the operator moves the lens frame and the sliding plate 16 which, as stated above, at this stage moves with the lens frame, in or out, as required, until the stud 26 (see Figs. 5 and 6) enters the hole 38 made in the projecting part 37. This will be readily ascertained by the clicking noise which results from this engagement. In this way the proper focal distance may be readily and accurately determined. The exposure is now made and to return the parts to primary position, the operator depresses the lever 30 until the pin 36 is withdrawn from such one of the holes 34 as it may have entered. Pressure is then applied upon the front edge of the sliding plate 16 and it is pressed rearwardly until its outer edge is flush with the outer edge of the front board of the camera and when it reaches this position, the inclined end 23 of the spring 21 (see Fig. 5) will have engaged under the squared end of the slot 12 in the slideway plate 9 and the spring 21 thus deflected downwardly, withdrawing the pin 24 from engagement with the base 43 of the lens support, whereupon the plate 16 will thereafter remain stationary but the lens frame will be moved still farther inwardly into the recess in the camera prepared for it. Thereupon the braces which support the front board of the camera being properly manipulated, the camera may be closed and the front board will be held in its elevated position, by the latch engaging with the stud 11 in the opening 10 made in the slideway plate 9.

The simplicity and compactness of the apparatus will be at once obvious to those who are familiar with this art. It is also obvious that modifications may be made in many of the parts without departing from the essentials of the invention. The construction which we have specifically illustrated and described is one form only of many in which the parts may be made. We therefore do not limit ourselves to the details, although claiming some of them in part, since we regard them as beneficial and desirable forms in which to physically construct the parts involved.

We claim:

1. A photographic camera having a movable lens frame, a movable plate adapted to engage with and support said frame, a slideway for the guidance of the movable plate, a resilient device adapted to lock the lens frame to the movable plate, and another resilient device adapted to engage with and lock the movable plate in a predetermined focal position.

2. A photographic camera having a movable lens frame, a movable plate adapted to engage with and support said frame, a slideway for the guidance of the movable plate, a stop on the movable plate in the path of the lens frame, whereby both are compelled to move outwardly together, a resilient device adapted to lock the lens frame to the movable plate and which is brought into action by the outward movement of said plate, and another resilient device adapted to engage with and lock the movable plate in a predetermined focal position.

3. A photographic camera having a movable lens frame, a movable plate adapted to engage with and support said frame, a slideway for the guidance of the movable plate, a stop on the movable plate in the path of the lens frame, whereby both are compelled to move outwardly together, a resilient device carried by the movable plate, adapted to lock the lens frame to the movable plate and which is brought into action by the outward movement of said plate and thrown out of action by its inward movement, and another resilient device adapted to engage with and lock the movable plate in a predetermined focal position.

4. A photographic camera embodying a movable lens frame, a movable supporting plate for the lens frame, a stop on the said plate in the path of the lens frame, a slideway for the guidance of the movable plate, and a resilient device which automatically locks the lens frame to the movable plate when the frame engages with the stop on the plate.

5. A photographic camera embodying a movable lens frame, a movable supporting plate for the lens frame, a slideway for the guidance of the movable plate, and a resilient device carried by the plate adapted to lock the lens frame to the plate and which is brought into action by the outward movement of the plate and thrown out of action by its extreme inward movement.

6. A photographic camera having a movable lens frame, a movable plate adapted to engage with and support said frame, a slideway for the guidance of the movable plate, a stop on the movable plate in the path of the lens frame, whereby both are compelled to move outwardly together, a resilient device carried by the movable plate, adapted to lock the lens frame to the movable plate and which is brought into action by the outward movement of said plate and thrown out of action by its inward movement, and an adjustable device adapted to engage with the movable plate and determine its focal position.

7. A photographic camera having a movable lens frame, a movable plate adapted to engage with and support said frame, a slideway for the guidance of the movable plate, a stop on the movable plate in the path of the lens frame, whereby both are compelled to move outwardly together, a resilient device carried by the movable plate, adapted to lock the lens frame to the movable plate and which is brought into action by the outward movement of said plate and thrown out of action by its inward movement, and an adjustable device provided with a plurailty of focus determining means.

8. A photographic camera having a movable lens and lens frame, a movable plate which supports the lens frame, an automatically acting lock which locks the lens frame to the plate at a predetermined degree of projection, and a device which automatically determines the degree of projection for any given focus.

9. In a camera, a movable support for the lens embodying a lens frame, a movable plate with which the lens frame engages and over which it slides, a guideway for the plate and a latch carried by the plate which automatically locks the lens frame to the plate during the act of projection and automatically unlocks them from each other during the act of retraction.

In testimony whereof we have signed our names to this specification in the presence of two subscribing witnesses.

GEORGE W. TOPLIFF.
CARL BORNMANN.

Witnesses:
A. DEICHELMANN,
H. P. MOXON.